(12) United States Patent
Norton et al.

(10) Patent No.: US 10,532,624 B2
(45) Date of Patent: Jan. 14, 2020

(54) METHODS AND APPARATUS TO CALIBRATE HEIGHT SENSORS OF A VEHICLE SUSPENSION

(71) Applicant: Ford Global Technologies, LLC, Dearborn, MI (US)

(72) Inventors: Russ Lee Norton, Brownstown Township, MI (US); Timothy Panagis, Ypsilanti, MI (US); Daniel Lee Grohnke, Lambertville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 361 days.

(21) Appl. No.: 15/450,907

(22) Filed: Mar. 6, 2017

(65) Prior Publication Data
US 2018/0251000 A1    Sep. 6, 2018

(51) Int. Cl.
*G01B 7/14*       (2006.01)
*B60G 17/019*    (2006.01)

(52) U.S. Cl.
CPC ......... *B60G 17/01908* (2013.01); *G01B 7/14* (2013.01); *B60G 2400/25* (2013.01)

(58) Field of Classification Search
None
See application file for complete search history.

(56) References Cited

U.S. PATENT DOCUMENTS

| | | | |
|---|---|---|---|
| 4,838,574 A * | 6/1989 | Baraszu | B60G 17/0165 280/5.515 |
| 5,031,934 A | 7/1991 | Soltis | |
| 5,068,792 A * | 11/1991 | Lehr | B60G 17/0185 280/6.157 |
| 5,142,897 A | 9/1992 | Pischke et al. | |
| 5,180,024 A * | 1/1993 | Eto | B60G 17/0155 180/41 |
| 5,461,564 A * | 10/1995 | Collins | B60G 17/01933 280/5.514 |
| 6,234,654 B1 * | 5/2001 | Okuchi | B60Q 1/10 362/276 |
| 6,445,178 B1 | 9/2002 | Hoekstra | |
| 8,160,774 B2 * | 4/2012 | Li | B60G 13/001 188/266 |

(Continued)

FOREIGN PATENT DOCUMENTS

| | | |
|---|---|---|
| CN | 204452257 | 7/2015 |
| JP | 2013240504 | 12/2013 |
| KR | 20080088215 | 10/2008 |

*Primary Examiner* — Natalie Huls
*Assistant Examiner* — Jermaine L Jenkins
(74) *Attorney, Agent, or Firm* — Ray Coppiellie; Hanley, Flight & Zimmerman, LLC (57) ABSTRACT

Methods and apparatus to calibrate height sensors of a vehicle suspension are described herein. An example method includes measuring a first voltage output of a height sensor coupled to a control arm of a suspension when the control arm is at a first position, associating the first voltage output to the first position of the control arm, measuring a second voltage output of the height sensor when the control arm is at a second position, associating the second voltage output to the second position of the control arm, measuring a third voltage output of the height sensor when the control arm is in a third position, and associating the third voltage output to the third position of the control arm.

18 Claims, 7 Drawing Sheets

(56) References Cited

U.S. PATENT DOCUMENTS

| | | | |
|---|---|---|---|
| 8,175,770 B2* | 5/2012 | Talty | B60G 17/018 |
| | | | 701/37 |
| 8,191,874 B2* | 6/2012 | Inoue | B60G 11/27 |
| | | | 188/267 |
| 8,755,971 B2* | 6/2014 | MacFarlane | B60G 17/0185 |
| | | | 280/5.5 |
| 8,775,021 B2 | 7/2014 | Bonarens et al. | |
| 9,452,657 B1* | 9/2016 | Giaier | B60Q 1/08 |
| 9,783,018 B2* | 10/2017 | Ogino | B60G 11/27 |

* cited by examiner

METHODS AND APPARATUS TO CALIBRATE HEIGHT SENSORS OF A VEHICLE SUSPENSION

FIELD OF THE DISCLOSURE

This disclosure relates generally to vehicle suspensions and, more particularly, to methods and apparatus to calibrate height sensors of a vehicle suspension.

BACKGROUND

Some vehicles employ adjustable vehicle suspension control systems to improve vehicle handling, improve aerodynamics, and/or improve navigation over irregular road surfaces (e.g., speed bumps, pot holes, railroad crossing rails, etc.). Some such example vehicle suspension control systems employ ride height characteristic(s) to improve ride performance and/or comfort for an occupant of the vehicle.

SUMMARY

An example method includes measuring a first voltage output of a height sensor coupled to a control arm of a suspension when the control arm is at a first position, associating the first voltage output to the first position of the control arm, measuring a second voltage output of the height sensor when the control arm is at a second position, associating the second voltage output to the second position of the control arm, measuring a third voltage output of the height sensor when the control arm is in a third position, and associating the third voltage output to the third position of the control arm.

Another example method includes mounting a height sensor to a vehicle frame subassembly, connecting the height sensor to an external power supply, moving at least a portion of the vehicle frame subassembly to a first position to record a first measurement prior to assembly of a vehicle, moving at least the portion of the vehicle frame subassembly to a second position to record a second measurement prior to assembly of the vehicle frame subassembly to the vehicle, and disconnecting the external power supply.

An example system includes a sensor coupled to a control arm of a vehicle suspension, and a processor. The processor is to measure a first voltage output of a height sensor when the control arm is at a first position, associate the first voltage output to the first position of the control arm, measure a second voltage output of the height sensor when the control arm is at a second position, associate the second voltage output to the second position of the control arm, measure a third voltage output of the height sensor when the control arm is in a third position, and associate the third voltage output to the third position of the control arm.

BRIEF DESCRIPTION OF THE DRAWINGS

The figures are not to scale. Wherever possible, the same reference numbers will be used throughout the drawing(s) and accompanying written description to refer to the same or like parts. arm

DETAILED DESCRIPTION

To improve vehicle performance characteristic(s) (e.g., vehicle versatility, vehicle handling, aerodynamics, fuel efficiency, etc.), vehicles employ control systems that enable adjustment of a vehicle suspension. To improve vehicle performance, vehicle control systems often employ control algorithms (e.g., wheel-end control algorithms, load-dependent damping algorithms, etc.) that control (e.g., adjust) suspension height(s), damper(s) and/or other vehicle equipment. Some example control algorithms employ a ride height measurement of the vehicle during operation of the vehicle. For example, ride height of the vehicle may be a clearance or distance between a bottom of the vehicle and a surface of a road. During operation, for example, a ride height measurement of a vehicle has an impact on a vehicle's center of gravity and, thus, may affect performance characteristic(s) during, for example, cornering, braking, traversing uneven terrain, and/or any other impact that may cause a shift in the vehicle's center of mass. For example, a ride height position may be employed to determine or adjust an amount and/or direction of camber (e.g., of a wheel) as the vehicle suspension moves between jounce and rebound. In some examples, differences in front-to-rear ride height of a vehicle can have an adverse effect on steering stability, steering effort and/or steering returnability.

Thus, accurate ride height information may improve performance characteristic(s) of the vehicle. Inaccurate ride height measurements, for example, may adversely affect ride comfort of the operator because the vehicle suspension and/or vehicle control system may be optimized based on measured ride height values. In some examples, inaccurate ride height data can cause control algorithms (e.g., wheel-end control algorithms, load dependent damping algorithms, etc.) to engage early, which can increase a harshness of the ride and provide a less comfortable ride for the operator and/or occupant of the vehicle, or to engage too late, which may cause the operator to experience more wheel-end motion than desired.

To provide ride height measurements, vehicle suspension control systems often include one or more height sensors (e.g., hall induction type height sensors, potentiometer type height sensors, etc.). To ensure accurate ride height measurements during operation of the vehicle, the height sensors of the vehicle suspension are calibrated for each vehicle. For example, a calibrated ride height determines a normal or operating travel range that the vehicle suspension (e.g., control arms of a short long arms (SLA) suspension) may travel during operation. For example, the calibrated ride height defines a travel range of a control arm between an upper end travel limit in a jounce direction (e.g., a first travel limit) and a lower end travel limit in a rebound direction (e.g., a second travel limit).

The height sensors of a vehicle are typically calibrated after assembly of the vehicle. For example, the height sensor(s) may be calibrated by measuring a height of the vehicle (e.g., the fully assembled vehicle) when, for example, the vehicle is parked (e.g., on a substantially flat or smooth surface). Such calibration of the height sensor is often referred to as single-point vehicle ride height calibration. Such single-point vehicle ride-height calibration of the height sensor is typically conducted at a curb height of the vehicle. For example, a curb height calibration of a height sensor using the single-point ride height may be performed when the vehicle is fully assembled, is carrying no cargo or passengers, has a partially filled (e.g., half filled) fuel tank, and is positioned on a substantially smooth surface.

After the single-point calibration value is obtained at, for example, the curb height of the vehicle, a slope or table may be determined with values representing other positions of the vehicle suspension such as, for example, the upper travel end limit and the lower end travel limit. For example, based on the single-point calibrated ride height value (e.g., the curb height value) used to calibrate the height sensor, a controller may employ extrapolation techniques to detect or define the first and second travel limits of the suspension in the jounce and rebound directions based on the single point height measurement (e.g., the curb height value) and an equation or sloped curve provided by a manufacturer of the height sensor.

However, single-point calibration methods may be susceptible to inaccurate suspension measurements of the extrapolated or estimated first and second travel limits of the suspension due to, for example, variation (e.g., due to tolerances, errors, etc.) in placement of the height sensor on the vehicle during assembly. For example, if the placement of the height sensor is slightly higher in one vehicle than in another vehicle due to manufacturing tolerances, the height sensor may provide different outputs representative or corresponding to a same ride height of the vehicles. Thus, for example, an equation or sloped curve may not correlate or account for such variations (e.g., in manufacturing tolerances, etc.) and, therefore, determining first and second travel limits based on extrapolation of the sloped curve can provide inaccurate vehicle ride height values.

Example methods and apparatus disclosed herein employ multipoint suspension calibration techniques to improve accuracy of ride height measurements obtained during operation of the vehicle. For example, the example methods and apparatus disclosed herein calibrate height sensors of vehicles using multiple ride height measurements obtained prior to, during, and/or after assembly of a vehicle suspension and/or a vehicle. For example, calibrated values representative of ride height values for a first travel limit and a second travel limit of a suspension may be measured or obtained during assembly of the vehicle. In some examples, one or more intermediate ride height values between the first and second travel limits may be measured during assembly of the vehicle. Additionally, calibrated values representative of or corresponding to a ride height value at a plant curb height of the vehicle may be measured after assembly of the vehicle. Calibrating the ride height sensors of the vehicle using multiple ride height values significantly improves accuracy of the vehicle suspension control systems (e.g., wheel-end control algorithms, load dependent damping algorithms, etc.). Thus, ride height sensors that are calibrated using the example multipoint suspension calibration methods and apparatus disclosed herein improve ride height accuracy compared to ride height sensors calibrated using single point calibration.

Figure 1:
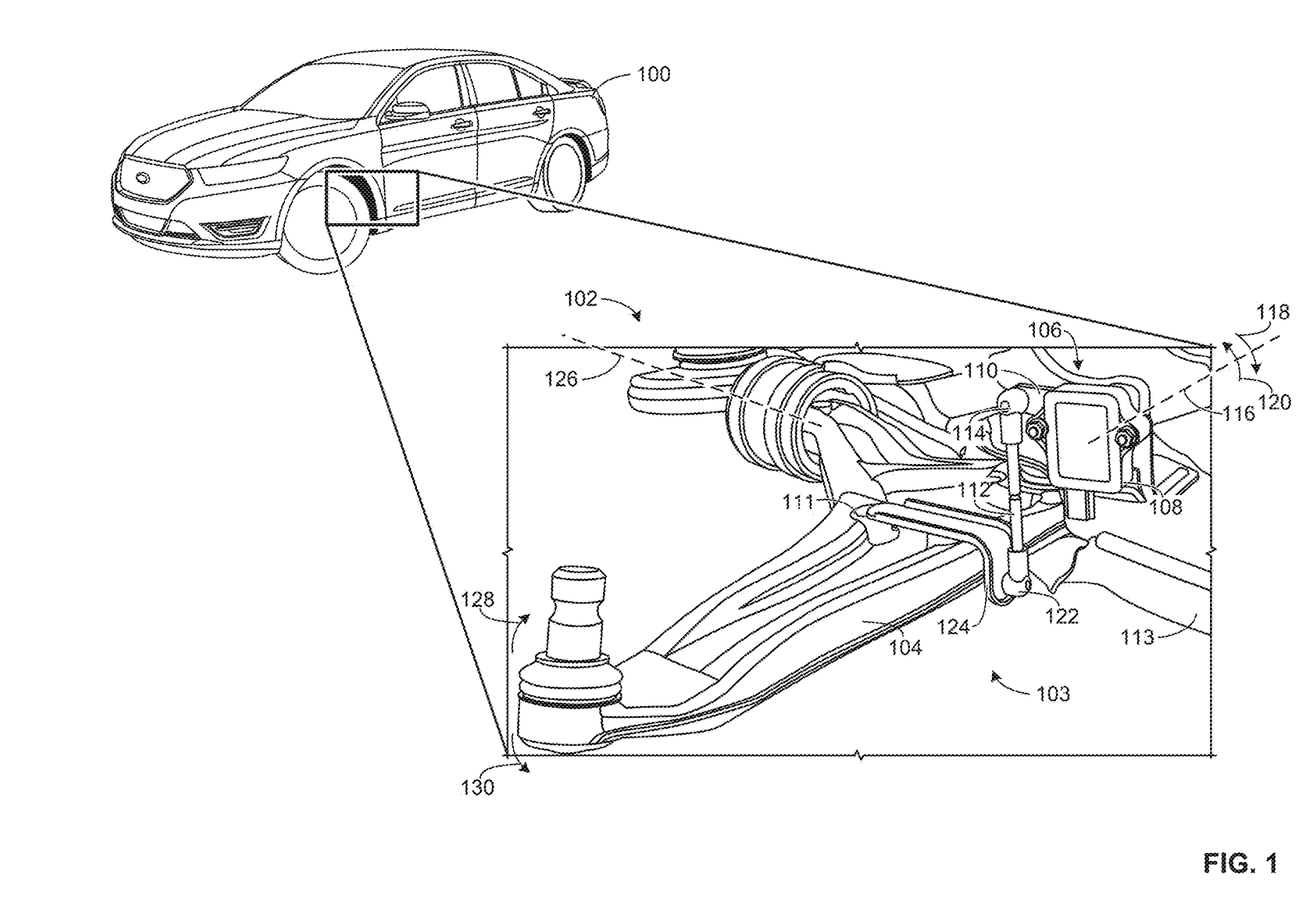
FIG. 1 depicts an example vehicle implemented with an example suspension constructed in accordance with the teachings of this disclosure.

FIG. 1 depicts an example vehicle 100 that may be implemented with an example frame subassembly 102 (e.g., a front suspension). The example frame subassembly 102 may include or support a suspension 103. For example, each wheel of the vehicle 100 may be coupled to or associated with a suspension 103 that is supported by the frame subassembly 102. The frame subassembly 102 of the illustrated example is a front frame subassembly and supports first wheels of the vehicle 100. However, in some examples, the frame subassembly 102 may be a rear frame subassembly that supports the rear wheels of the vehicle 100.

The suspension 103 of the illustrated example includes a control arm 104 and a height sensor 106 coupled to the control arm 104. The control arm 104 of the suspension 103 is associated with a wheel of the vehicle 100. Thus, each wheel supported by the frame subassembly 102 includes a control arm 104 and a height sensor 106. The height sensor 106 of the illustrated example measures a ride height value of the vehicle 100 that corresponds with the wheel that is supported by the control arm 104 associated with the height sensor 106. Although the example frame subassembly 102 includes only one height sensor 106 associated with each wheel, in some examples, the example vehicle 100 of the illustrated example may employ two or more height sensors 106 associated with each wheel of the vehicle 100.

The height sensor 106 of the illustrated example includes a housing 108, a rotatable link 110, and a rod 112. In the illustrated example, the housing 108 of the height sensor 106 is fixed to the frame subassembly 102 and does not move relative to the control arm 104. For example, the housing 108 of the illustrated example is attached or mounted to a support structure of the frame subassembly 102 that is relatively stationary (e.g., does not move with the control arm 104). In the illustrated example, the housing 108 is attached to a rail of the frame subassembly 102.

The rotatable link 110 of the illustrated example is rotatably coupled to the housing 108. For example, the rotatable link 110 has a first end rotatably coupled to the housing 108 and a second end rotatably coupled to the rod 112. The rotatable link 110 of the illustrated example rotates relative to the housing 108 about an axis of rotation 116 between a first direction 118 (e.g., a clockwise direction in the orientation of FIG. 2) and a second direction 120 (e.g., a counterclockwise direction in the orientation of FIG. 2). In the illustrated example, the first end of the rotatable link 110 is rotatably coupled to the housing 108 via a bushing and the second end of the rotatable link 110 is coupled to a first end of the control arm 104 via a first coupler 114 (e.g., a first ball joint). In some examples, the first coupler 114 at the first end of the rod 112 includes an opening (e.g., a threaded opening) that receives a fastener (e.g., a bolt) positioned at the second end of the rotatable link 110. However, in some examples, the second end of the rotatable link 110 may be coupled to the control arm 104 via a weld, a bolt, a clamp, a pin, and/or any other fastener(s). A second end of the rod 112 of the illustrated example is coupled to the control arm 104.

In the illustrated example, the second end of the rod 112 is coupled to the control arm 104 via a bracket 124. For example, the bracket 124 of the illustrated example has a first portion that is coupled to the surface 111 of the control arm 104 (e.g., via a bolt, welding, etc.) and a second end that is attached to the rod 112 via a second coupler 122 (e.g., a ball joint). For example, the second coupler 122 includes an opening (e.g., a threaded opening) to receive a fastener extending through the second portion of the bracket 124. In some examples, the bracket 124 may not be included and a coupling (e.g., an arm, a fastener, a stem, a bolt, etc.) protruding from a surface 111 of the control arm 104 may couple the control arm 104 and the second coupler 122. In the illustrated example, an axis of the first coupler 114 is substantially perpendicular to an axis of the second coupler 122. For example, an opening of the first coupler 114 is pivoted 90 degrees relative to an opening of the second coupler 122. For example, the control arm 104 of the illustrated example is pivotally coupled to a frame 113 (e.g., a rail) of the frame subassembly 102 via, for example, a bushing.

During operation, the rod 112 moves with the control arm 104 as the control arm 104 moves (e.g., rotates) relative to the frame 113 about a pivot axis 126 between a first travel limit in a jounce direction 128 (e.g., an upper end travel limit in the jounce direction 128) and a second travel limit in the rebound direction 130 (e.g., a lower end travel limit in the rebound direction 130). In turn, the rod 112 causes the rotatable link 110 to rotate about the axis of rotation 116 relative to the housing 108. For example, as the control arm 104 moves upward (e.g., in the jounce direction 128), the control arm 104 causes the rod 112 to move upward, causing the rotatable link 110 to rotate relative to the housing 108 in the first direction 118 about the axis of rotation 116 (e.g., clockwise direction in the orientation of FIG. 2). Likewise, as the control arm 104 moves downward (e.g., in the rebound direction 130), the control arm 104 causes the rod 112 to move downward, causing the rotatable link 110 to rotate relative to the housing 108 in the second direction 120 about the axis of rotation 116 (e.g., in a counterclockwise direction in the orientation of FIG. 2).

In the illustrated example, a degree of rotational movement of the control arm 104 provides a corresponding (e.g., substantially equal) degree of rotational movement of the rotatable link 110 (e.g., a corresponding degree of movement of the rotatable link 110 within plus or minus 10% of a degree of movement of the control arm 104). For example, a ratio between a degree of movement of the control arm 104 to a degree of movement of the rotatable link 110 may be a one-to-one ratio (e.g., plus or minus 10%). For example, a 15-degree rotation of the control arm 104 about the pivot axis 126 provides a corresponding 15-degree rotation of the rotatable link 110 about the axis of rotation 116. Such ratio may be provided via a length of the rod 112 (in a direction along a longitudinal length or axis of the rod 112), and/or a length of the rotatable link 110 (in a direction along a longitudinal length or axis of the rotatable link 110) and/or the position of the second coupler 122 relative to the surface 111 of the controller 104. However, in other examples, a ratio between a degree of movement of the control arm 104 to a degree of movement of the rotatable link 110 may be any other ratio (e.g., a 2:1 ratio; a 1:2 ratio, etc.).

Rotational motion of the rotatable link 110 varies (e.g., increases or decreases) an output parameter (e.g., a voltage output) of the height sensor 106. The height sensor 106 of the illustrated example is an inductive height sensor. However, in some examples, the height sensor 106 may be a potentiometer type sensor, and/or any other type of sensor to measure a change of a parameter (e.g., in voltage, current, etc.) as the control arm 104 moves between the first and second travel limits. To measure a change in an output parameter in response to movement of the control arm 104, the housing 108 of the height sensor 106 may include a sensor module or measurement device (e.g., a hall-effect sensor, a magnetic sensor, etc.). For example, the height sensor 106 may include a voltage determiner 310 of FIG. 3, to measure a change in voltage in response to the movement of the rotatable link 110.

As the control arm 104 moves between the first travel limit and the second travel limit, the height sensor 106 outputs a plurality of output parameters. More specifically, each output parameter (e.g., a voltage value) of the height sensor 106 corresponds to a different position (e.g., a height, a rotational position, an angular position, etc.) of the control arm 104 relative to the pivot axis 126 between the first and second travel limits. In some examples, the height sensor 106 provides an output parameter range that correlates or corresponds to a range of positions of the control arm 104 between the first and second travel limits. For example, a first output parameter measured at the first travel limit of the control arm 104 is an uppermost output parameter (e.g., a maximum voltage) of the output parameter range of the height sensor 106, and a second output parameter measured at the second travel limit of the control arm 104 is a lowermost output parameter (e.g., a minimum voltage) of the output parameter range. For example, as the control arm 104 moves from an initial or reference position (e.g., a midpoint between the first and second travel limits) to the first travel limit in the jounce direction 128, the output parameter (e.g., voltage output) measured by the height sensor 106 may increase. For example, the output parameter measured at the initial position may be 2.5 volts and the output parameter measured at the first travel limit may be between, for example, 4.5 and 5 volts. Similarly, as the control arm 104 moves from the initial position to the second travel limit in the rebound direction 130, the output parameter (e.g., voltage output) may decrease. For example, the output parameter measured at the initial position may be 2.5 volts and the output parameter measured at the second travel limit may be between, for example, 0 and 0.5 volts. In some examples, the output parameters of the height sensor 106 may vary approximately linearly as the control arm 104 moves between the first travel limit and the second travel limit. In some examples, the linear variation of the output parameter of the height sensor 106 may be provided by a manufacturer of the height sensor 106.

During calibration, the height sensor 106 measures output parameters (e.g., voltages) associated with the first travel limit and the second travel limit. In some examples, during calibration, the height sensor 106 measures an output parameter (e.g., voltages) at an intermediate position between the first travel limit and the second travel limit. For example, as the control arm 104 is moved between the first travel limit and the second travel limit, an output parameter (e.g., voltage) may be measured at each 15-degree intervals of rotation of the rotatable link 110. Alternatively, other intervals may be used. In some examples, calibration of the sensor 106 may be based on the output parameters of only the first travel limit and the second travel limit.

Figure 2:
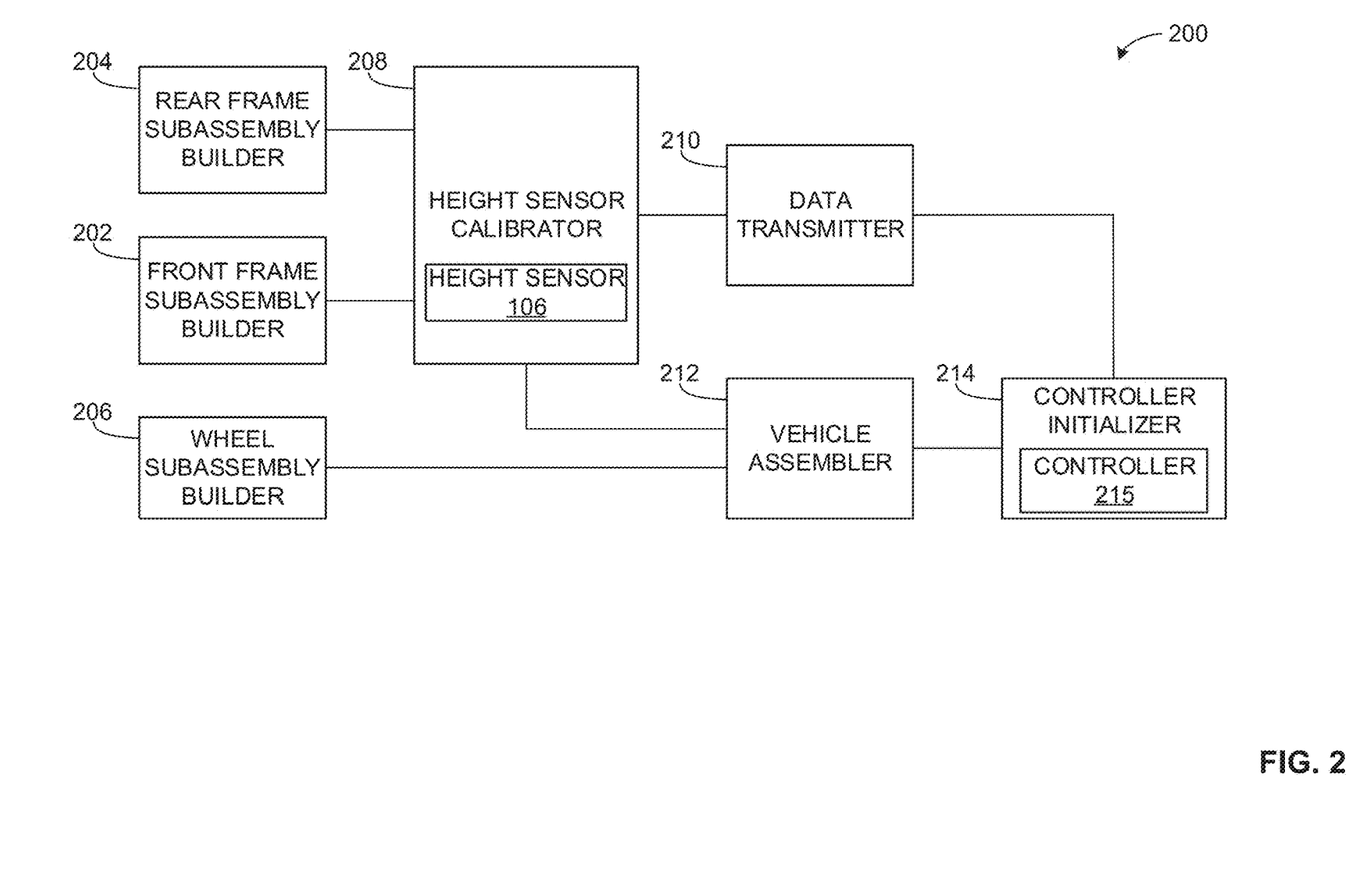
FIG. 2 depicts an example assembly process that may be used to assemble the example vehicle of FIG. 1.

FIG. 2 depicts an example process 200 that may be used to calibrate the height sensor 106 of the vehicle 100 of FIG. 1. The example process 200 includes a front frame subassembly builder 202, a rear frame subassembly builder 204, a wheel subassembly builder 206, a height sensor calibrator 208, a data transmitter 210, a vehicle assembler 212, and a controller initializer 214.

The example front frame subassembly builder 202 and the rear frame subassembly builder 204 each build the respective frame subassemblies (e.g., each having the frame subassembly 102) prior to calibration of the height sensor 106. For example, the example front frame subassembly builder 202 and the example rear frame subassembly builder 204 build the respective front and rear frame subassemblies (e.g., the frame subassembly 102). In some examples, the front and rear frame subassemblies may each include a sub frame, a steering gear, a stability bar, the example control arm 104 (e.g., a lower control arm, a lateral link), the example height sensor 106, a wheel knuckle, a hub bearing, a rotor, a caliper, a strut assembly and/or other component(s). Additionally or alternatively, the front frame assembly and/or the rear frame subassembly may include additional or alternative components and/or one or more of the components mentioned above may be excluded.

The example height sensor calibrator 208 calibrates the height sensor 106 of the frame subassembly 102. For example, the height sensor calibrator 208 may calibrate the height sensors of the front frame subassembly and/or the rear frame subassembly. For example, each of the front and rear frame subassemblies includes one height sensor 106 associated with each wheel of the frame subassembly 102. Thus, each frame subassembly 102 may include two height sensors 106 (e.g., a height sensor 106 associated with the driver side of the vehicle 100 and a height sensor 106 associated with a passenger side of the vehicle 100) that are calibrated (e.g., simultaneously) by the height sensor calibrator 208.

To calibrate the height sensor 106, the height sensor calibrator 208 determines output parameters or voltages of the height sensor 106 that correspond to the first travel limit (e.g., in the jounce direction 128) and the second travel limit (e.g., in the rebound direction 130) of the control arm 104. In some examples, the height sensor calibrator 208 measures voltage readings of the height sensor 106 representative of additional positions along a travel path of the control arm 104 between the first and second travel limits. For example, voltage measurements may be recorded at 15-degree intervals of rotation of the control arm 104 between the first and second travel limits. In some examples, the height sensor calibrator 208 of the illustrated example may correlate or associate (e.g., map) a voltage output representative of a position of the control arm 104. For example, the height sensor calibrator 208 associates or associated (e.g., maps) a first voltage output associated with the control arm 104 positioned at the first travel end limit and a second voltage output associated with the control arm 104 position at the second travel end limit.

In some examples, each height sensor 106 of the frame subassembly 102 (e.g., the front subassembly and/or the rear subassembly) may be calibrated independently of each other. For example, a voltage measurement from one height sensor 106 does not affect a voltage measurement of another height sensor 106. Independent calibration of the height sensor 106 corresponding to each wheel increases ride height measurement accuracy during operation of the vehicle 100.

In some examples, the front frame subassembly, the rear frame subassembly, and the wheel subassemblies are each assigned a unique identification number corresponding to a vehicle 100. The unique identification number may be a vehicle identification number (VIN) or other identification number used during the manufacturing process of the vehicle 100. The subassemblies may be identified by the same identification number and any data (e.g., calibration data) associated with one subassembly may be assigned (e.g., tagged with, associated with) the same identification number. During assembly of the vehicle 100, the vehicle 100 may be assembled using the components and data associated with a specified unique identification number. In some examples, the data collected by the height sensor calibrator 208 is associated with the unique identification number associated with the subassemblies and the vehicle 100.

The data collected by the height sensor calibrator 208 may be transmitted to the controller initializer 214 via the data transmitter 210. The data transmitter 210 may include an end of the line system and may be operative to transfer data electronically between the height sensor calibrator 208 and the controller initializer 214. In some examples, the data transmitter 210 transmits calibration data to a server and/or storage device. For example, the data transmitter 210 may include a server (e.g., an end-of-line system) in communication with both the height sensor calibrator 208 and the controller initializer 214. Alternatively, the data may be transferred using data storage devices (e.g., RFID tags capable of storing data) attached to the subassemblies and/or shipped with the subassemblies (e.g., flash drives, discs, etc.). This data may include the voltages in addition to any other information that may be associated with the identification number during the calibration.

After the height sensors 106 are calibrated via the height sensor calibrator 208, the vehicle assembler 212 (e.g., an assembly plant) assembles the vehicle 100 (e.g., the front frame subassembly, the wheel subassemblies, and the rear frame subassembly). In some examples, the vehicle assembler 212 is in a different location than the front frame subassembly builder 202, the rear frame subassembly builder 204, and/or the wheel subassembly builder 206. In some examples, the vehicle assembler 212 assembles the vehicle 100 using any components associated with the unique identification number. Alternatively, each assembly may have a unique identification number, and a vehicle 100 may be assembled using subassemblies with different identification numbers. In such examples, the data associated with each of the identification numbers of the subassemblies is transferred to the controller 215 of the vehicle 100 by the data transmitter 210 and/or the controller initializer 214. Examples of other components of the vehicle 100 that may be assembled by the vehicle assembler 212 include an engine or motor, a body of the vehicle 100, an electrical system, the controller 215, etc.

After the vehicle 100 is assembled via the vehicle assembler 212 and is in a pre-roll state (e.g., completely assembled and ready for alignment), the example controller initializer 214 may initialize the controller 215. In some examples, the example controller 215 may be a continuously controlled damping (CCD) controller. In some examples, the example controller 215 may be connected to a vehicle electrical system during assembly. Additionally, in some examples, the controller 215 may be initialized by uploading data and/or algorithms to the controller 215 to improve operation of the vehicle 100. The controller initializer 214 of the illustrated example communicates with the data transmitter 210 to receive data in any form in which the data transmitter 210 may transmit data. In the illustrated example, the example controller initializer 214 receives data (e.g., calibrated values) collected by the height sensor calibrator 208 during the calibration of the height sensor 106.

In some examples, the example controller initializer 214 correlates or associates the measured voltages provided by the height sensor 106 corresponding to the measured positions of the control arm 104 between the first and second travel limits. For example, the controller initializer 214 may create a table or a chart based on the voltages and heights measured during calibration. Alternatively, the controller initializer 214 may determine or obtain an equation that may be derived from the collected data points that may be used by a controller 215 to determine a ride height of the vehicle 100 based on a position of the control arm 104.

Additionally, the controller initializer 214 of the illustrated example measures a voltage output of the height sensor 106 when the control arm 104 is positioned at a plant curb height after the vehicle 100 has been fully assembled. The plant curb height position and the corresponding voltage reading of the height sensor 106 are added to the associated table or chart of the correlated voltages and heights.

In some examples, the voltage and the curb height position are measured and transmitted to the controller 215 at the alignment pit. A diagnostic routine may calculate a slope or equation that may be used to correlate a voltage reading of the height sensor 106 to a corresponding ride height of a wheel during operation of the vehicle 100. The correlation of voltage to ride height is more accurate than traditional methods of calibration because the correlation is determined using multipoint calibration techniques disclosed herein.

Figure 3:
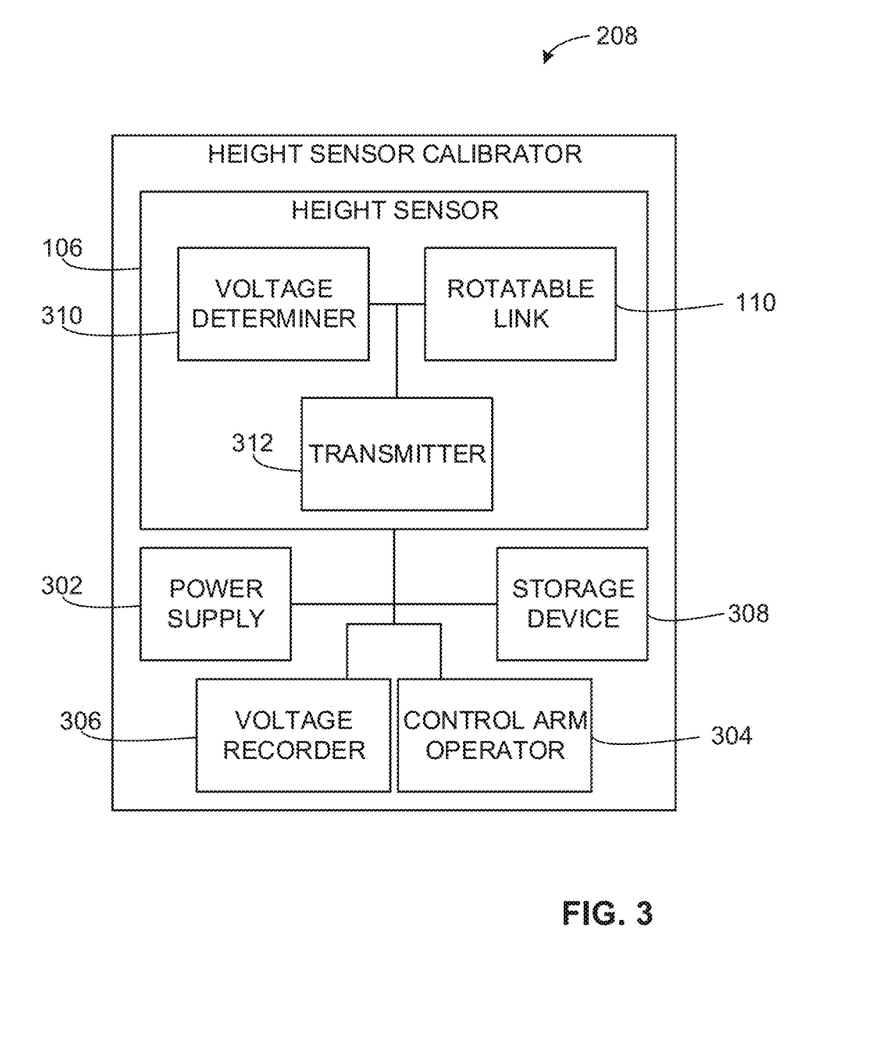
FIG. 3 depicts an example height sensor calibrator of the example assembly process of FIG. 2.

FIG. 3 depicts a block diagram representing the example height sensor calibrator 208 of FIG. 2. The example height sensor calibrator 208 of the illustrated example includes the height sensor 106, a power supply 302, a control arm operator 304, a voltage recorder 306, and a storage device 308. The example height sensor 106 includes a voltage determiner 310, the rotatable link 110, and a transmitter 312.

The example height sensor calibrator 208 calibrates the example height sensor 106 by recording voltage data from the height sensor 106 and transmitting the voltage data to the controller initializer 214 via the data transmitter 210. In some examples, the height sensor calibrator 208 may additionally include a control arm position determiner to determine the position (e.g., an angular position of the travel range) of the control arm 104 at a given voltage measurement. In such examples, the height sensor calibrator 208 also transmits the positional data for the control arm 104 to the controller initializer 214 via the data transmitter 210.

The example power supply 302 provides electrical power to the example height sensor 106 during calibration. The example power supply 302 may be, for example, a 12-volt direct current (DC) power supply, a power source of a manufacturing plant, or any other source of power operative to provide electrical power to the height sensor 106 and/or other components of the height sensor calibrator 208. The power supply 302 of the illustrated example is connected to each of the height sensor 106 prior to calibration and disconnected after calibration is complete. The power supply 302 is used in place of a vehicle electrical system (e.g., a vehicle electrical system 402 of FIG. 4), which may not be electrically connected to the height sensor 106 until the vehicle assembler 212 assembles the vehicle 100. In some examples, a machine (e.g., a robot arm or robotic assembly equipment) may receive instruction from the height sensor calibrator 208 to electrically couple the power supply 302 to the height sensor 106. The power supply 302 may be operative to provide power to other components of the height sensor calibrator 208, such as the control arm operator 304.

The control arm operator 304 moves the control arm 104 from an initial position (e.g., a starting position, a neutral position, etc.) toward the first travel limit. During calibration, the control arm operator 304 moves the control arm 104 in the jounce direction 128 to the first travel limit and moves the control arm 104 in the rebound direction 130 to the second travel limit. In some examples, a machine moves the control arm 104 based on instructions from the height sensor calibrator 208. In alternative examples, the control arm 104 may be moved manually (e.g., via an operator). Measuring the voltage from the height sensor 106 at multiple points along the range of travel of the control arm 104 enables for more precise determination of the position the control arm 104 to enable a more accurate determination of a vehicle ride height during operation of the vehicle 100, which improves vehicle handling characteristics.

In some examples, calibrating the height sensor 106 at a subassembly stage of the suspension enables the control arm 104 to be moved to the first and second travel limits without resistance from a biasing element (e.g., a spring) of a suspension (e.g., an SLA suspension). The biasing element of the suspension is added during vehicle assembly, after the height sensor calibrator 208 calibrates the height sensor 106 by moving the control arm 104 to the first and second travel limits. In some examples, the height sensor 106 may be calibrated when or while the biasing element of the suspension is coupled to the suspension.

As the control arm operator 304 moves the control arm 104 toward the first and second travel limits, the rotatable link 110 of the height sensor 106 rotates with the control arm 104. In turn, the height sensor 106 of the illustrated example outputs a parameter. In the illustrated example, the output parameter is a voltage output that is monitored by the voltage determiner 310. The voltage determiner 310 transmits the measured voltage output to the voltage recorder 306. The voltage recorder 306 records the voltage output associated with the first and second travel limits. In some examples, during calibration, the voltage recorder 306 also records voltage outputs associated with intermediate positions of the control arm 104 between the first and second travel limits (e.g., every 15-degrees of rotation of the rotatable link 110 or the control arm 104). For example, a voltage output when the rotatable link 110 is in a position between the first and second travel limits may vary (e.g., approximately linearly) between the voltages corresponding to the first and second travel limits. Thus, if the travel range is associated with a voltage range of 0-5 volts as described above, a measured voltage of 2.5 volts may be approximately halfway or a midpoint between the first and second travel limits (e.g., the initial position).

In some examples, in addition to measuring voltage outputs, positional data for the first and second travel limits and/or intermediate positions of the control arm 104 may be determined via an external measurement device. In some such examples, each voltage output may be associated with a corresponding position of the control arm 104.

In some examples, manufacturing tolerances of the control arm 104 and/or the height sensor 106 may affect a voltage output corresponding to a rotational position of the control arm 104. For example, if the height sensor 106 has a range of 0-5 volts, the control arm 104 placement may be such that the first travel limit of the control arm 104 corresponds to a 4.75V voltage reading and the second travel limit of the control arm 104 corresponds to a 0.25V voltage reading to avoid a potential for the control arm 104 to move out of range of the height sensor 106. Thus, to accommodate variation in placement and/or tolerances of the height sensor 106 and/or the control arm 104 that may affect a measurement output of the height sensor 106, a voltage at the first travel limit may vary between, for example, 4.5-5 volts. Similarly, the voltage at the second travel limit may vary between 0-0.5 volts, in accordance with the variation of the voltage at the first travel limit. In some examples, the first and second travel limits are at known heights or rotational positions of the control arm 104 and/or ride heights of the frame subassembly 102. In some examples, the voltage corresponding to the midpoint position of the travel range of the control arm 104 may be between, for example. 2.25 volts and 2.75 volts based on the tolerances and/or variation due to placement of the height sensor 106 and/or manufacturer tolerances of the height sensor 106. Thus, recording voltage measurements at the first travel limit and the second travel limit may account for the variations in tolerances by detecting any shifts or changes in the voltage and/or the height measurements. Calibrating the height sensor 106 to account for the variation of the voltage and positional data provides a more accurately and precisely determined ride height and position of each wheel.

During the calibration of the height sensor 106, the voltage recorder 306 and/or the height sensor 106 may store voltage data on the storage device 308. In some examples, the transmitter 312 of the height sensor 106 transmits the data for all positions of the control arm 104 (e.g., the height sensor 106 is continuously transmitting data throughout the height sensor calibration) to the voltage recorder 306. In some examples, the voltage recorder 306 records only some of the data (e.g., the data corresponding to the first travel end limit, the second travel limit, and/or any intermediate position(s)). In some examples, the height sensor 106 continuously transmits data and the storage device 308 stores all of the data until the data is transmitted to the controller initializer 214 via the data transmitter 210. Alternatively, in some examples, the voltage recorder 306 may be excluded and the height sensor 106 directly transmits the data to the storage device 308.

In addition to storing data from the height sensor 106, the storage device 308 may be operative to store instructions for the height sensor calibrator 208. For example, the storage device 308 may include instructions for the control arm operator 304 to move the control arm 104 between the first and second travel limits. Additionally, the storage device 308 may include instructions for the voltage recorder 306 to record the voltages corresponding to the first travel limit, the second travel limit, and/or any intermediate position(s) between the first and second travel limits. In some examples, the storage device 308 may include a unique identification number associated with the front subassembly 102 being calibrated and instructions for associating the unique identification number with the recorded voltage data. The storage device 308 may further include instructions for transmitting the voltage data via the data transmitter 210 to the controller initializer 214.

Figure 4:
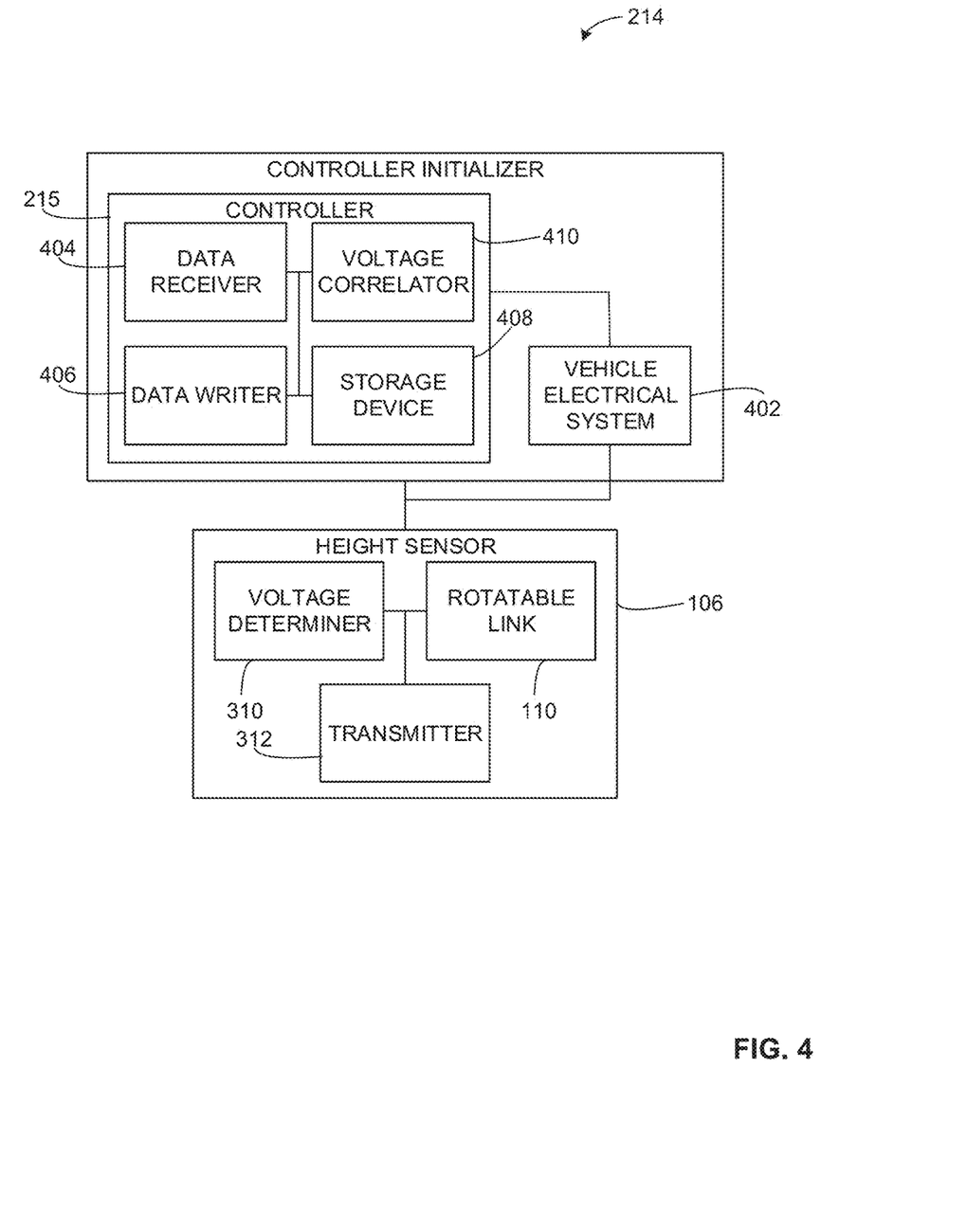
FIG. 4 depicts an example controller initializer that may be used to implement the example assembly process of FIG. 2.

FIG. 4 depicts a block diagram representing the example controller initializer 214 of FIG. 2. The controller initializer 214 includes the controller 215 and a vehicle electrical system 402. The controller 215 of the illustrated example includes a data receiver 404, a data writer 406, a storage device 408, and a voltage correlator 410. The controller initializer 214 is communicatively coupled to the height sensor 106.

The example data receiver 404 receives calibration data related to the height sensor calibration performed by the height sensor calibrator 208. The example data receiver 404 may receive the voltage data output by the height sensor 106 and the positional data of the control arm 104 corresponding to the measured voltage data. The example data writer 406 may be operative to write the data to the storage device 408 of the controller 215. Alternatively, in some examples, the data receiver 404 and the data writer 406 may be combined such that the data receiver 404 may write the data to the example storage device 408.

The example voltage correlator 410 may read the voltage data from the storage device 408 and may correlate the voltage data of the height sensor 106 with the positional data of the control arm 104. In some examples, the positional data of the control arm 104 is received by the data receiver 404. In some examples, the positional data of the control arm 104 may be determined by, for example, the control arm operator 304. For example, the positional data of the control arm 104 may be determined by sensing a resistance, employing a contact switch, detecting a pressure of fluid (e.g., hydraulic fluid of the control arm operator) exceeding a threshold, position sensor, and/or any other apparatus or method to detect a position of the control arm 104 relative to the first travel limit position, the second travel limit, and/or any other position therebetween. For example, when the control arm operator 304 detects resistance in motion when moving the control arm 104 in the jounce direction 128 (i.e., the control arm operator 104 can no longer move the control arm 104 in the jounce direction 128), the control arm operator 304 may detect the first travel limit. Likewise, when the control arm operator 304 detects resistance in motion when moving the control arm 104 in the rebound direction 130, the control arm operator 304 may detect the second travel limit. In some examples, a first contact switch may be positioned at the first travel limit that activates or triggers when the control arm operator 304 moves the control arm 104 to the first travel limit position and a second contact switch may be positioned at the second travel limit that activates or triggers when the control arm operator 304 moves the control arm 104 to the second travel limit position. In some examples, the positional data of the control arm 104 may be measured by the height sensor calibrator 208, may be known, or may be determined based on the specifications of the control arm 104 and the frame subassembly 102. The voltage correlator 410 may, in some examples, create a chart or table to associate the correlated voltage and positional data. The example controller 215 may use the correlated voltage and positional data to determine a ride height of the vehicle 100.

After assembly of the vehicle 100, the example height sensor 106 is connected to the example vehicle electrical system 402. The example height sensor 106 is operative to measure a curb height of the assembled vehicle 100. For example, the curb height may be measured when the vehicle 100 is fully assembled, includes no passengers or cargo, and has a partially filled (e.g., quarter full) tank of gas. During the alignment of the vehicle 100, the height sensor 106 measures a position (e.g., a third position) of the control arm 104 when the vehicle 100 is at the curb height. The transmitter 312 of the height sensor 106 transmits the data to the controller initializer 214 via the data transmitter 210. The data receiver 404 receives the data and the data writer 406 writes the data to the controller 215. The voltage correlator 410 then adds the additional voltage data associated with the curb height to the correlated voltage and positional data. In some examples, the curb height of the vehicle 100 is measured using a height measurement device of an alignment pit (e.g., a laser measurement device) of the vehicle assembler 212. In some such examples, the example voltage correlator 410 correlates the curb height to a voltage recorded when the vehicle 100 is at the curb height. However, measuring the first and second travel limits in addition to the curb height enables the voltage correlator 410 to more accurately determine a ride height of the vehicle 100 during operation of the vehicle 100.

The controller 215 may use the correlated values during operation of the vehicle 100 to determine the ride height of the vehicle 100 during operation based on the voltage readings of the height sensor 106. In some examples, the controller 215 may extrapolate data between the measured points to determine the ride height at a given voltage. In some examples, to determine a ride height value during operation of the vehicle 100, the controller 215 extrapolates or determines a ride height value based on the first voltage reading measured or associated with the first travel limit position of the control arm 104, the second voltage reading measured or associated with the second travel limit position of the control arm 104 determined by the height sensor calibrator 208 (e.g., obtained during the subassembly stage of the vehicle 100), and the third voltage reading measured or associated with the plant curb height determined by the controller initializer 214 (e.g., at the post assembly stage of the vehicle 100). Recording voltage outputs of the height sensor 106 at multiple positions of the control arm 104 and the voltage of the height sensor 106 at a plant curb height of the vehicle increases an accuracy of the determination of a ride height of the vehicle 100.

Additionally, algorithms that employ ride height values may accurately determine a position of each wheel. In some examples, a position of a wheel arch with respect to a wheel center is also determined in an alignment pit of an assembly plant (e.g., the vehicle assembler 212). For example, the height of the suspension may correlate to the voltage measured by the height sensor 106, and the position of the wheel arch relative to the wheel center may be a value that is measured during vehicle alignment. Thus, using the height of the suspension and the position of the wheel arch relative to the wheel center, an actual ride height can be determined.

While an example manner of implementing the example height sensor calibrator 208 and the example controller initializer 214 of FIG. 2 are illustrated in FIGS. 3 and 4, respectively, one or more of the elements, processes and/or devices illustrated in FIGS. 3 and 4 may be combined, divided, re-arranged, omitted, eliminated and/or implemented in any other way. Further, the example height sensor 106, the example power supply 302, the example control arm operator 304, the example voltage recorder 306, the example storage device 308, the example voltage determiner 310, the example transmitter 312, the example vehicle electrical system 402, the example data receiver 404, the example data writer 406, the example storage device 408, the example voltage correlator 410, and/or, more generally, the example height sensor calibrator 208 and the controller initializer 214 of FIG. 2 may be implemented by hardware, software, firmware and/or any combination of hardware, software and/or firmware. Thus, for example, any of the example height sensor 106, the example power supply 302, the example control arm operator 304, the example voltage recorder 306, the example storage device 308, the example voltage determiner 310, the example transmitter 312, the example vehicle electrical system 402, the example data receiver 404, the example data writer 406, the example storage device 408, the example voltage correlator 410 and/or, more generally, the example height sensor calibrator 208 and the controller initializer 214 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, height sensor 106, the example power supply 302, the example control arm operator 304, the example voltage recorder 306, the example storage device 308, the example voltage determiner 310, the example transmitter 312, the example vehicle electrical system 402, the example data receiver 404, the example data writer 406, the example storage device 408, the example voltage correlator 410 is/are hereby expressly defined to include a tangible computer readable storage device or storage disk such as a memory, a digital versatile disk (DVD), a compact disk (CD), a Blu-ray disk, etc. storing the software and/or firmware. Further still, the example height sensor calibrator 208 and the controller initializer 214 of FIG. 2 may include one or more elements, processes and/or devices in addition to, or instead of, those illustrated in FIGS. 2-4, and/or may include more than one of any or all of the illustrated elements, processes and devices.

Figure 5:
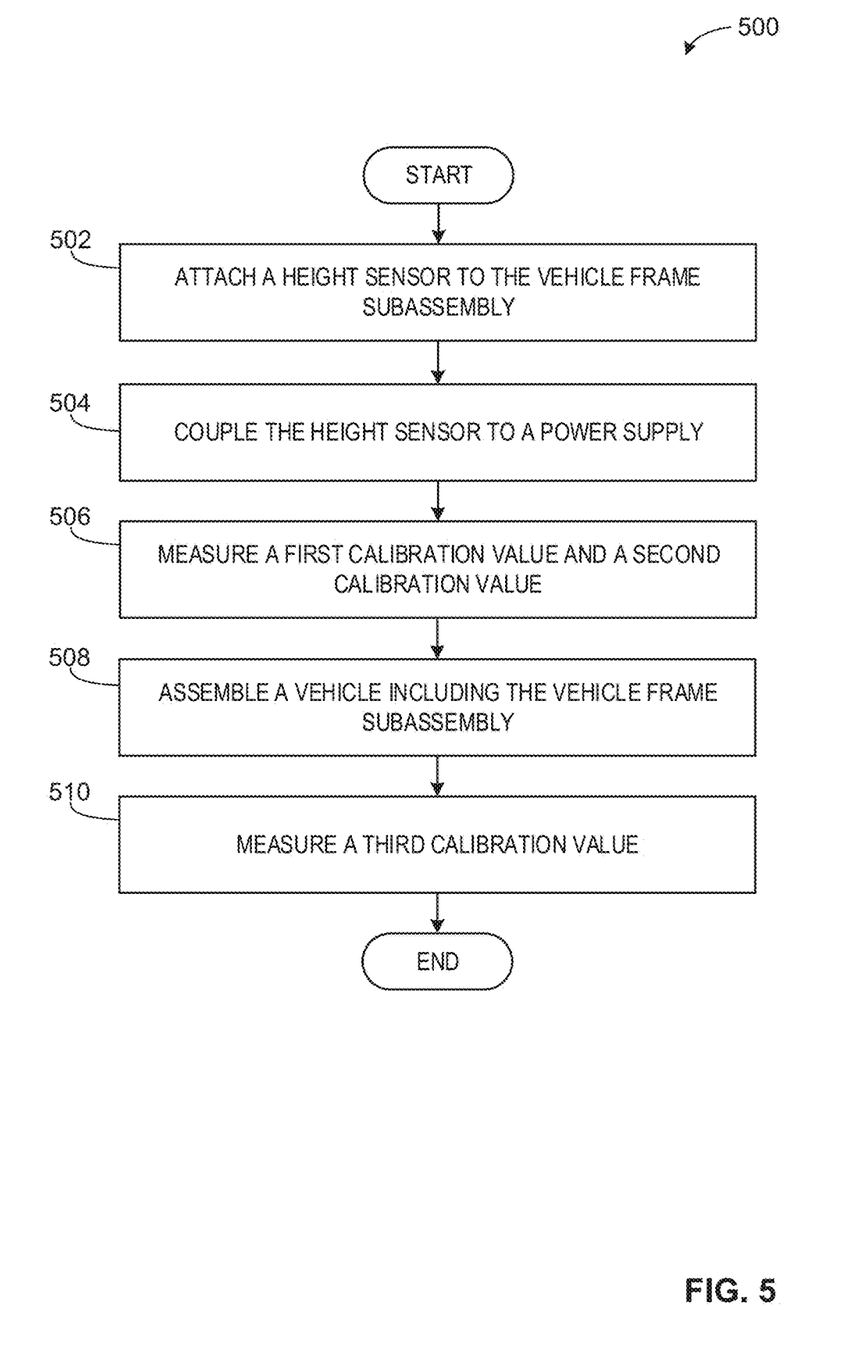
FIG. 5 is a flowchart representative of an example method that may be performed to implement the example assembly process of FIG. 2.
Figure 6:
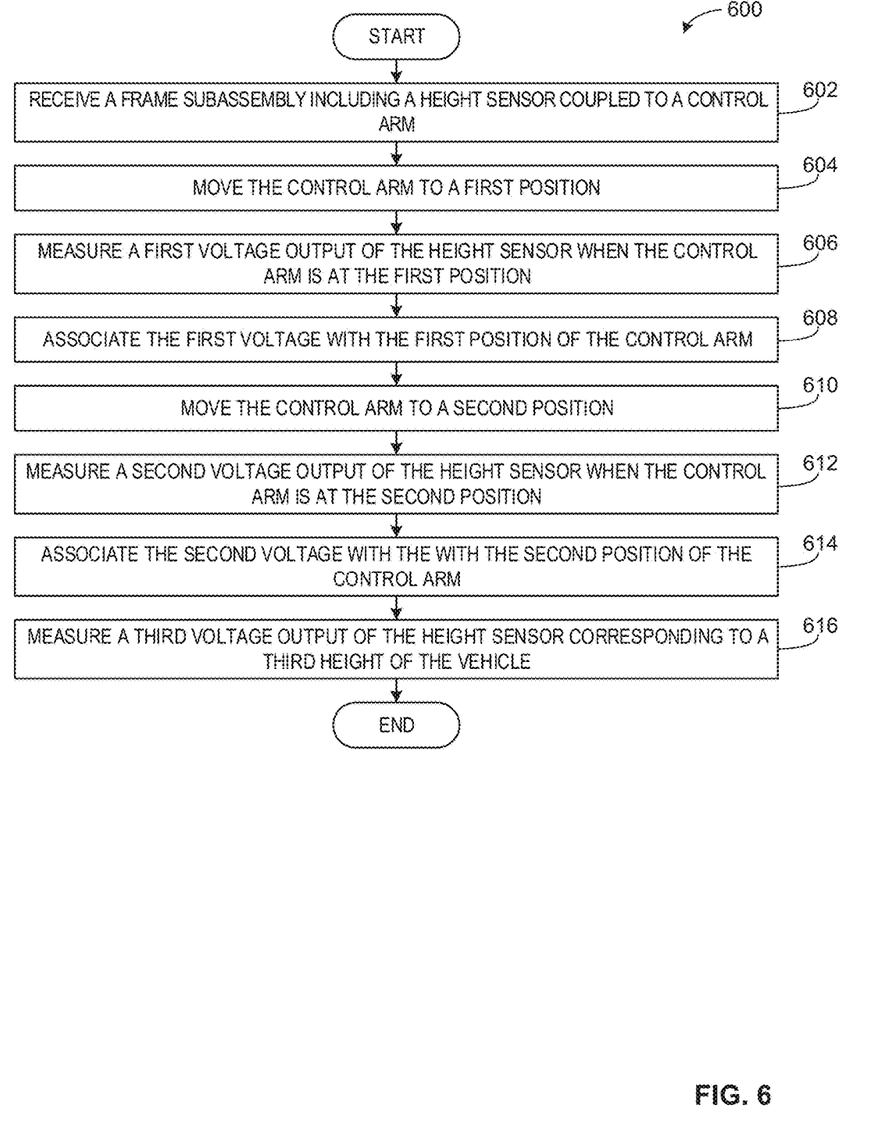
FIG. 6 is a flowchart of an example method that may be performed to implement the example height sensor calibrator of FIG. 3.

FIGS. 5-6 are flowcharts representative of example methods for implementing the example assembly process of FIG. 2 and/or that may be performed to implement the example height sensor calibrator 208 of FIG. 3 and the example controller initializer 214 of FIG. 4.

In this example, the machine readable instructions comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the methods illustrated in FIGS. 5 and 6, many other methods of implementing the example process 200, height sensor calibrator 208, and controller initializer 214 may alternatively be used. For example, the order of execution of the blocks may be changed, and/or some of the blocks described may be changed, eliminated, or combined.

As mentioned above, the example methods of FIGS. 5 and 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example methods of FIGS. 5 and 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Referring to FIG. 5, the example method 500 begins when the height sensor 106 and the control arm 104 are attached to the frame subassembly 102 (block 502). For example, the height sensor 106 is attached to the control arm 104 for each wheel of the frame subassembly 102. For example, the housing 108 of the height sensor 106 is attached to a subframe component (e.g., a rail) and the rod 112 is attached to the control arm 104. In some examples, the height sensor 106 and the control arm 104 are attached to the front frame subassembly by the front frame subassembly builder 202. In some examples, the height sensor 106 and the control arm 104 are attached to the rear frame subassembly by the rear frame subassembly builder 204.

The height sensor calibrator 208 then electrically couples the height sensor 106 to an external power supply 302 during the height sensor calibration (block 504). The height sensor calibrator 208 measures a least a first calibration value and a second calibration value (block 508). For example, the first calibration value may correspond to an output from the height sensor 106 when the control arm 104 is at the first travel limit, and the second calibration value may correspond to an output from the height sensor 106 when the control arm 104 is at the second travel limit. In some examples, additional output values from the height sensor 106, which correspond to positions of the control arm 104 between the first travel limit and the second travel limit, may be recorded. In some examples, to detect the first travel limit, the control arm operator 304 moves the control arm 104 in the first direction 128 until the control arm operator 304 detects a resistance. When a resistance to movement in the first direction is detected, the control arm operator 304 identifies the first travel limit. The voltage determiner 310 and the voltage recorder 306 record the voltage output when the control arm 104 is in the first travel limit position. Likewise, the control arm operator 304 detects a resistance to movement in the second direction 130. The voltage determiner 310 and the voltage recorder 306 detect the voltage output when the control arm 104 is in the second travel limit position. In some examples, only the voltages associated with this first and second travel limits of the control arm 104 are recorded or detected.

After the calibration of the height sensor 106 is complete, the power supply 302 is disconnected from the height sensor 106. In some examples, the example height sensor calibrator 208 may determine if an additional frame subassembly (e.g., a rear frame subassembly) is to be built and/or calibrated. The height sensor calibrator 208 calibrates the height sensor 106 associated with each wheel of the frame subassembly 102.

The vehicle assembler 212 then assembles the vehicle 100 including the vehicle frame subassembly and/or other components of the vehicle 100 (block 508). For example, the other components of the vehicle 100 may include a controller 215, a motor or engine, etc. After the vehicle 100 is fully assembled, a third calibration value is measured (block 510). For example, the third calibration value may correspond to a position of the control arm 104 when the vehicle 100 is at the curb height. In some examples, the third calibration value is measured by the height sensor 106 during initialization of the controller 115 via the controller initializer 214.

FIG. 6 is an example method of implementing the height sensor calibrator 208 of FIG. 2. Referring to FIG. 6, the example method 600 begins when the example height sensor calibrator 208 receives a frame subassembly 102 including height sensors 106 attached to the control arm 104 (block 602). For example, the height sensor calibrator 208 may receive either a front frame subassembly or a rear frame subassembly. The control arm operator 304 of the example height sensor calibrator 208 moves the control arm 104 to a first position (e.g., the first travel limit, the upper end travel limit in the jounce direction 128) (block 604). The example voltage determiner 310 measures the voltage of the height sensor 106 when the control arm 104 is at the first position (block 606). The first voltage measured by the height sensor 106 is associated with the first position of the control arm 104 (block 608). In some examples, the voltage measured by the height sensor 106 is stored in the storage device 308 of the height sensor calibrator 208. The example height sensor calibrator 208 moves the control arm 104 to a second position (e.g., a second travel limit, the lower end travel limit in the rebound direction 130) (block 610). The example height sensor 106 measures the voltage of the height sensor 106 when the control arm 104 is at the second position (block 612). The second voltage measured by the height sensor 106 is associated with the second position of the control arm 104 (block 614). In some examples, the voltage measured by the height sensor 106 is stored in the storage device 308 of the height sensor calibrator 208. In some examples, the height sensor 106 also measures voltages periodically (e.g., every 15-degrees of rotation) as the control arm 104 moves between the first position and the second position. In some examples, only the voltages outputs associated with the first and second travel limits are recorded for calibration purposes during assembly. Additionally, after the vehicle 100 is assembled, a third voltage is measured when the control arm 104 is at a third position (block 616). For example, the third position may be a position of the control arm 104 at curb height of the vehicle 100 (block 616). The third voltage and the third position of the control arm 104 corresponding to the curb height are written to the storage device 408 of the controller.

Figure 7:
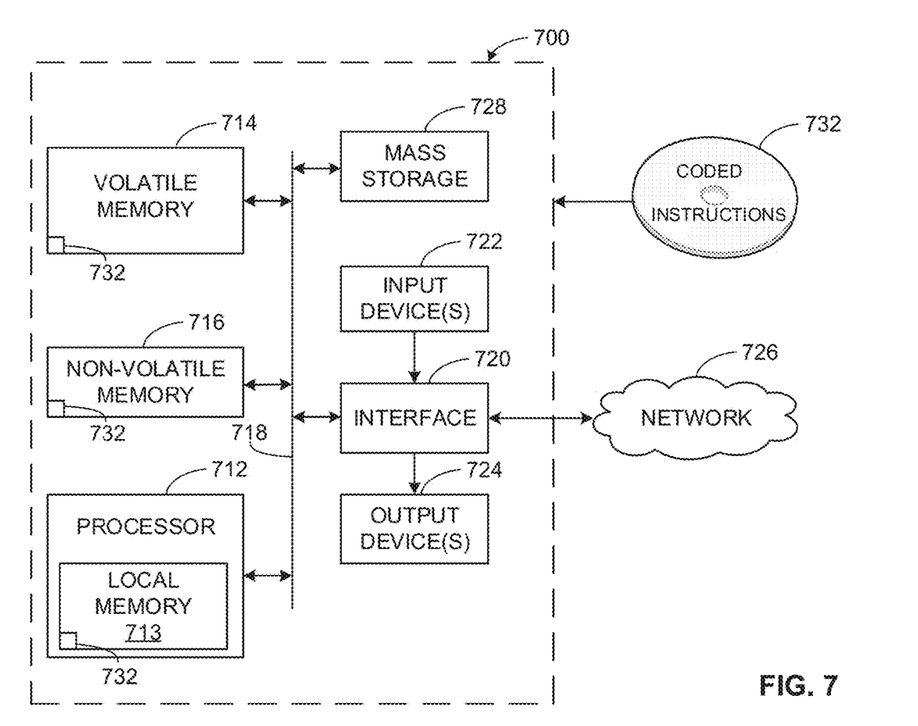
FIG. 7 is a schematic illustration of an example processor diagram that may be used and/or programmed to implement the example methods of FIGS. 5 and 6, and more generally, to implement the example assembly process of FIG. 2, the example height sensor calibrator of FIG. 3, and/or the example controller initializer of FIG. 4.

FIG. 7 is a block diagram of an example processor platform 1000 capable of executing the instructions of FIGS. 5 and 6 to implement the apparatus of FIGS. 1-4. The processor platform 700 can be, for example, a server, a personal computer, a mobile device (e.g., a cell phone, a smart phone, a tablet such as an iPad™), a personal digital assistant (PDA), an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 that may implement the methods of FIGS. 5-6 may be stored in the mass storage device 728, in the volatile memory 714, in the non-volatile memory 716, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   during assembly of a frame subassembly:
      measuring a first voltage output of a height sensor coupled to a control arm of a suspension when the control arm is at a first position;
      associating the first voltage output to the first position of the control arm;
      measuring a second voltage output of the height sensor when the control arm is at a second position;
      associating the second voltage output to the second position of the control arm;
   after assembling the frame subassembly:
      measuring a third voltage output of the height sensor when the control arm is in a third position; and
      associating the third voltage output to the third position of the control arm.

2. The method as defined in claim 1, further including moving the control arm to the first position when a suspension biasing element is not coupled to the control arm.

3. The method as defined in claim 1, further including moving the control arm to the second position when a suspension biasing element is not coupled to the control arm.

4. The method as defined in claim 1, further including moving the control arm to the third position after a suspension biasing element is coupled to the control arm.

5. The method as defined in claim 4, wherein the third position of the control arm is representative of a curb height.

6. The method as defined in claim 1, further comprising moving the control arm to the first position and moving the control arm to the second position during assembly of the frame subassembly.

7. A method comprising:
   mounting a height sensor to a vehicle frame subassembly;
   connecting the height sensor to an external power supply;
   moving at least a portion of the vehicle frame subassembly toward a first position to record a first measurement prior to assembly of the vehicle frame subassembly to a vehicle;
   moving the at least the portion of the vehicle frame subassembly toward a second position to record a second measurement prior to assembly of the vehicle frame subassembly to the vehicle; and
   disconnecting the external power supply.

8. The method as defined in claim 7, assembling a vehicle including the vehicle frame subassembly.

9. The method as defined in claim 8, further including recording a third measurement corresponding to a third position of the vehicle frame subassembly after assembly of the vehicle frame subassembly assembled to the vehicle.

10. The method as defined in claim 9, further including associating the first, second, and third measurements to the corresponding first, second, and third positions.

11. The method as defined in claim 9, wherein the third position corresponds to a curb height of the assembled vehicle.

12. The method as defined in claim 7, wherein moving the at least the portion of the vehicle frame subassembly to the first position includes moving a control arm toward a first travel limit and moving the at least the portion of the vehicle frame subassembly to the second position includes moving the control arm toward a second travel limit.

13. The method as defined in claim 12, further including:
   detecting the control arm is at the first travel limit; and
   detecting the control arm is at the second travel limit.

14. A system comprising:
   a height sensor coupled to a control arm of a vehicle suspension; and
   a processor, the processor to:
   measure a first voltage output of the height sensor when the control arm is at a first position;
   associate the first voltage output to the first position of the control arm;
   measure a second voltage output of the height sensor when the control arm is at a second position;
   associate the second voltage output to the second position of the control arm;
   measure a third voltage output of the height sensor when the control arm is in a third position; and
   associate the third voltage output to the third position of the control arm, wherein the first and second voltage outputs are measured during assembly of a frame subassembly and the third voltage output is measured after assembly of the frame subassembly.

15. The system as defined in claim 14, further including a control arm operator to move the control arm to the first position when a suspension biasing element is not coupled to the control arm.

16. The system as defined in claim 15, further including the control arm operator to move the control arm to the second position when the suspension biasing element is not coupled to the control arm.

17. The system as defined in claim 16, wherein the control arm operator moves the control arm to the first position and moves the control arm to the second position during assembly of the frame subassembly.

18. The system as defined in claim 14, wherein the third position of the control arm is representative of a curb height of a vehicle.

* * * * *